(12) United States Patent
Tonegawa

(10) Patent No.: US 10,750,047 B2
(45) Date of Patent: Aug. 18, 2020

(54) IMAGE PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Nobuyuki Tonegawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/744,506

(22) PCT Filed: Jul. 27, 2016

(86) PCT No.: PCT/JP2016/003477
§ 371 (c)(1),
(2) Date: Jan. 12, 2018

(87) PCT Pub. No.: WO2017/046989
PCT Pub. Date: Mar. 23, 2017

(65) Prior Publication Data
US 2018/0198945 A1    Jul. 12, 2018

(30) Foreign Application Priority Data

Sep. 15, 2015   (JP) ................. 2015-182232

(51) Int. Cl.
| | | |
|---|---|---|
| *G06F 3/12* | (2006.01) | |
| *H04N 1/32* | (2006.01) | |
| *H04L 12/58* | (2006.01) | |
| *H04N 1/00* | (2006.01) | |
| *G03G 15/00* | (2006.01) | |

(52) U.S. Cl.
CPC ......... *H04N 1/32475* (2013.01); *H04L 51/10* (2013.01); *H04N 1/00474* (2013.01); *H04N 1/32464* (2013.01); *G03G 15/502* (2013.01)

(58) Field of Classification Search
None
See application file for complete search history.

(56) References Cited

U.S. PATENT DOCUMENTS

2002/0143883 A1* 10/2002 Miyake .................. H04L 51/00
709/206
2003/0184803 A1* 10/2003 Yamada ............. H04N 1/33307
358/1.16

(Continued)

FOREIGN PATENT DOCUMENTS

| EP | 1560415 A1 | 8/2005 |
|---|---|---|
| JP | 2005-217624 A | 8/2005 |

(Continued)

OTHER PUBLICATIONS

International Search Report and Written Opinion issued in parent International Application PCT/JP2016/003477 dated Sep. 20, 2016.

(Continued)

*Primary Examiner* — Huo Long Chen
(74) *Attorney, Agent, or Firm* — Venable LLP

(57) ABSTRACT

An image processing apparatus receives a number of pages to be included in one file from a user, and reads an original. The image communication apparatus divides image data of the read original at each set of the received number of pages, and creates a file including the image data for each division of the divided image data.

4 Claims, 10 Drawing Sheets

(56) References Cited

U.S. PATENT DOCUMENTS

| | | | |
|---|---|---|---|
| 2005/0071500 A1* | 3/2005 | Tonegawa | H04L 51/066 709/236 |
| 2005/0190394 A1* | 9/2005 | Ohue | H04N 1/00204 358/1.13 |
| 2005/0280860 A1* | 12/2005 | Ito | H04L 51/066 358/1.15 |
| 2008/0313290 A1* | 12/2008 | Park | H04N 1/00214 709/206 |
| 2009/0204641 A1 | 8/2009 | Chambers | |
| 2010/0064363 A1 | 3/2010 | Kano | |
| 2011/0071829 A1* | 3/2011 | Itoh | G10L 15/26 704/243 |
| 2012/0127544 A1 | 5/2012 | Morita | |
| 2014/0362046 A1 | 12/2014 | Ikeda | |
| 2014/0362406 A1* | 12/2014 | Ikeda | H04N 21/4117 358/1.15 |
| 2014/0362409 A1 | 12/2014 | Ikeda | |
| 2015/0207945 A1* | 7/2015 | Odaira | H04N 1/00217 358/1.15 |

FOREIGN PATENT DOCUMENTS

| | | | |
|---|---|---|---|
| JP | 2012094112 A | | 5/2012 |
| JP | 2012-114657 A | | 6/2012 |
| JP | 2013047957 A | * | 3/2013 |
| JP | 2014-239376 A | | 12/2014 |
| JP | 2015-139160 A | | 7/2015 |
| RU | 2369034 C2 | | 9/2009 |

OTHER PUBLICATIONS

RU Office Action issued in corresponding RU Application No. 2018113446 dated Nov. 14, 2018.

RU Search Report issued in corresponding RU Application No. 2018113446 dated Oct. 31, 2018.

* cited by examiner

[Fig. 1]
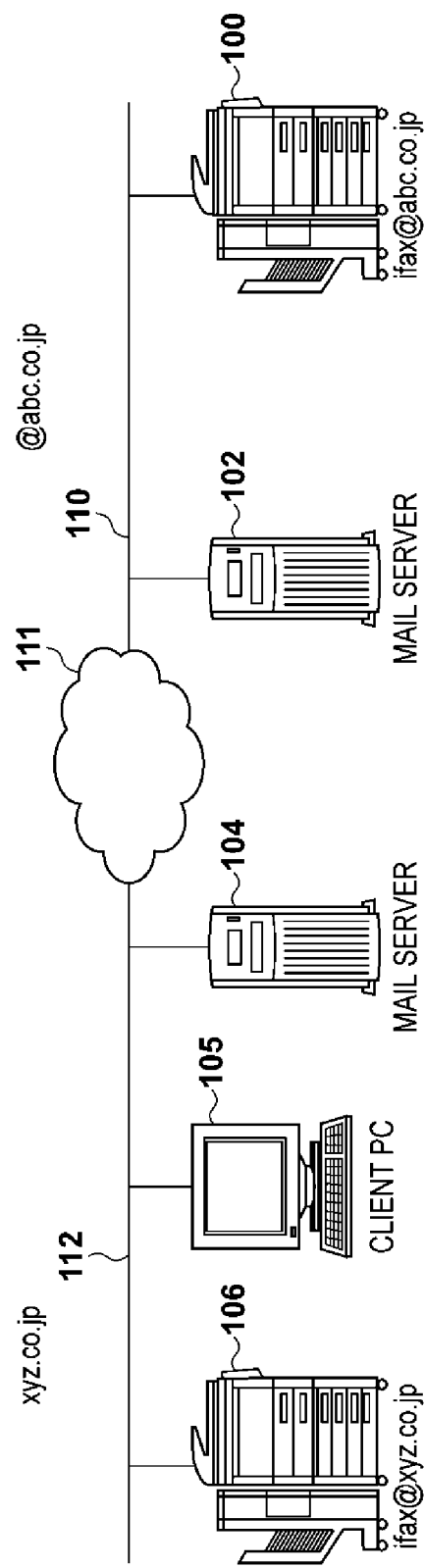

[Fig. 2]
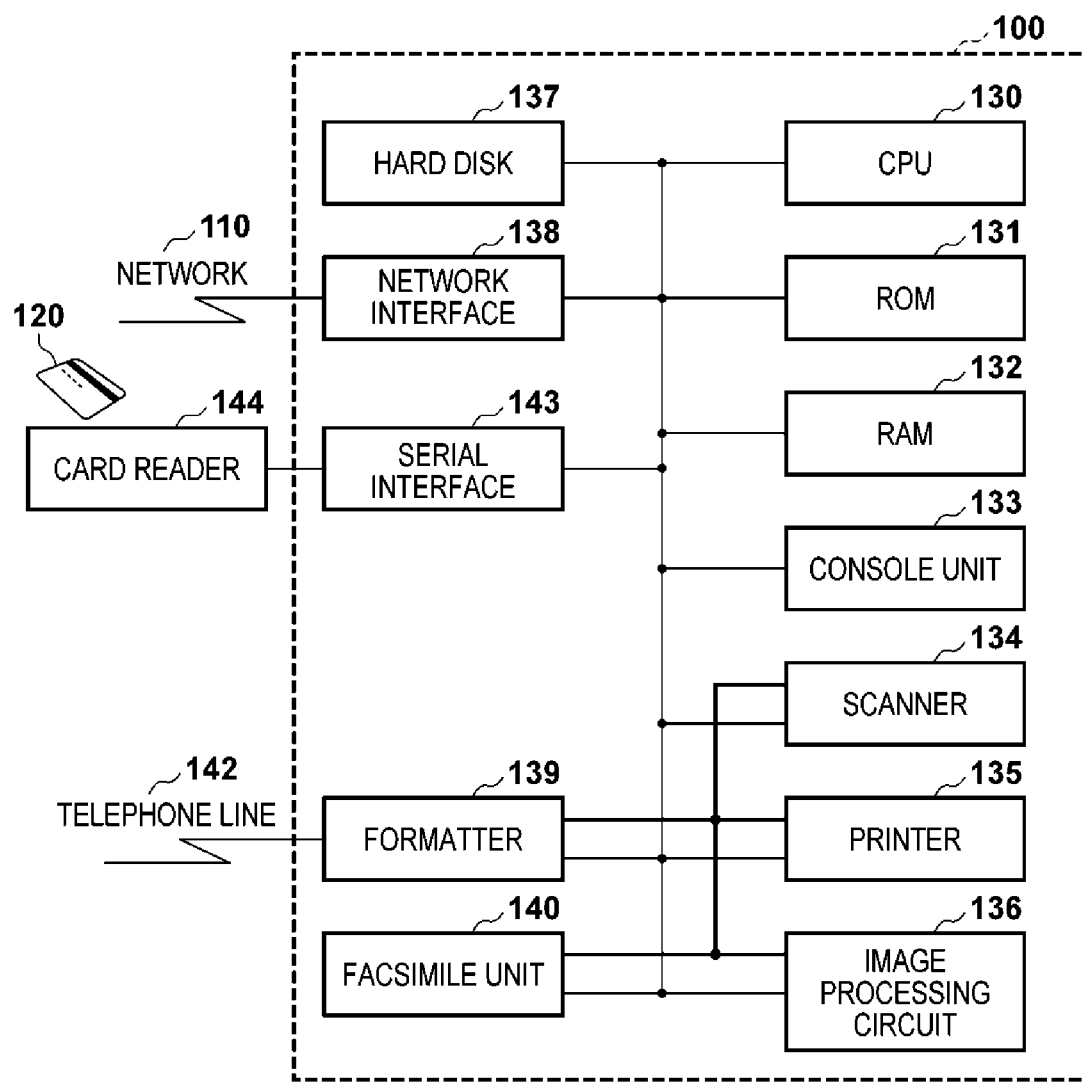

[Fig. 3]
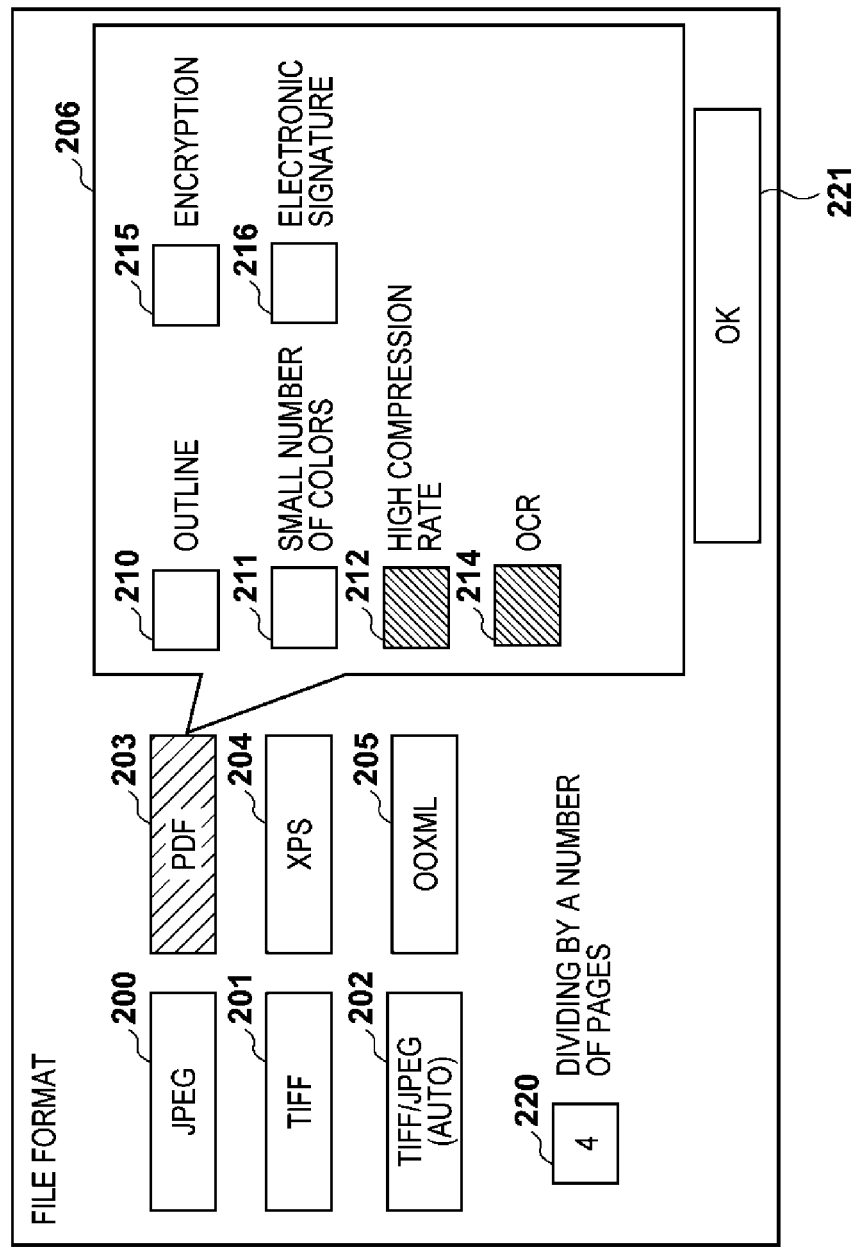

[Fig. 4]
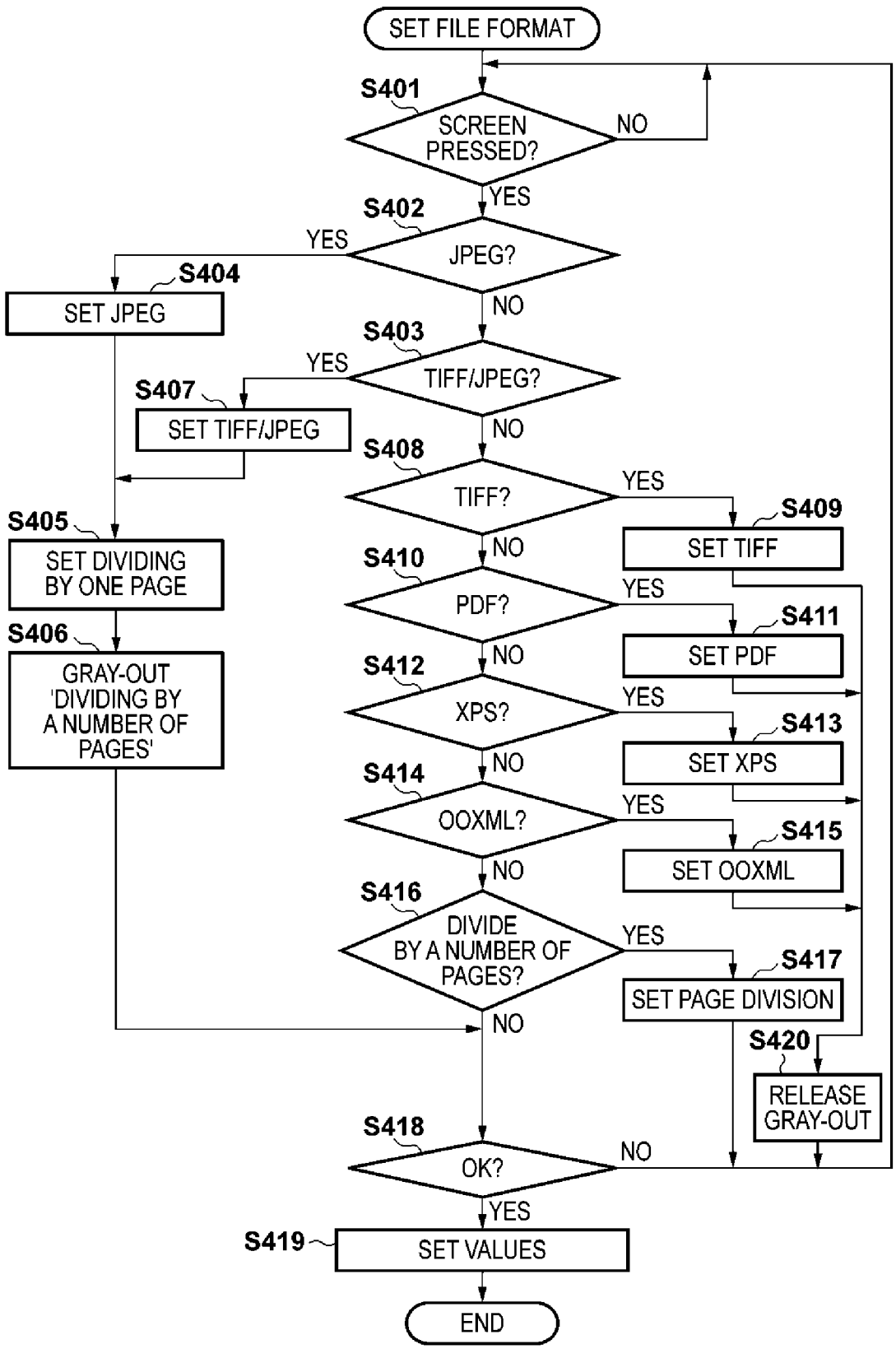

[Fig. 5]
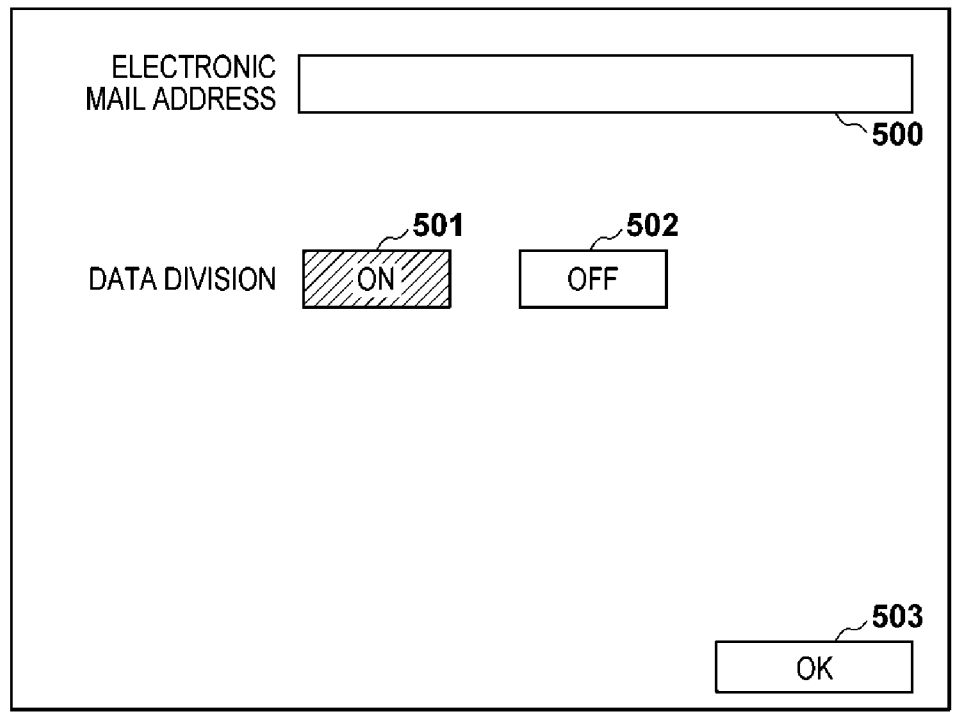
[Fig. 6]
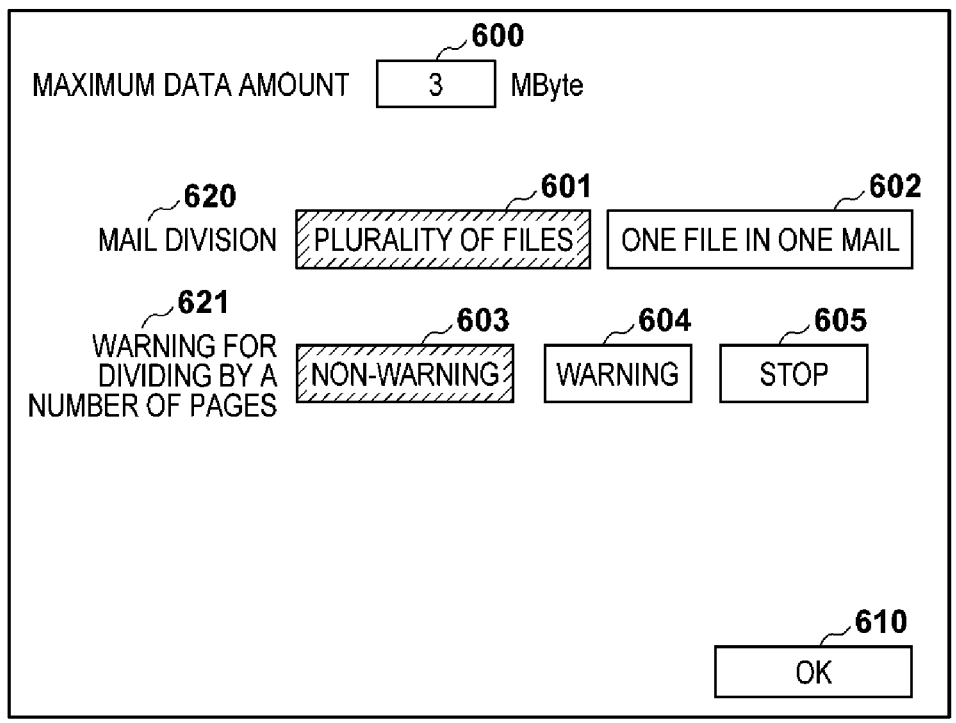

[Fig. 7A]
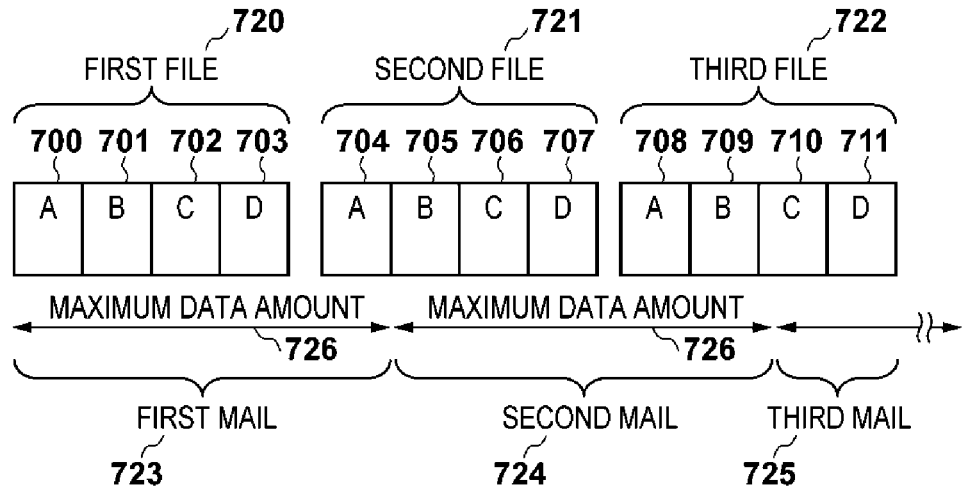
[Fig. 7B]
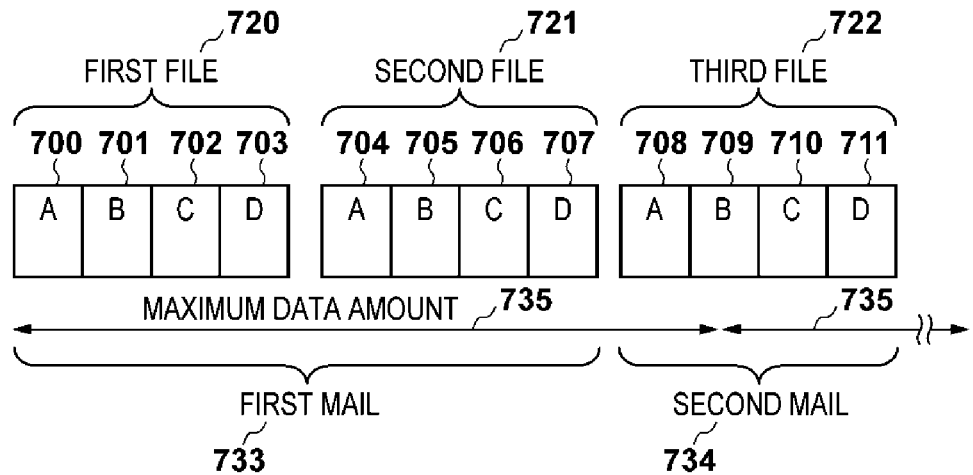
[Fig. 7C]
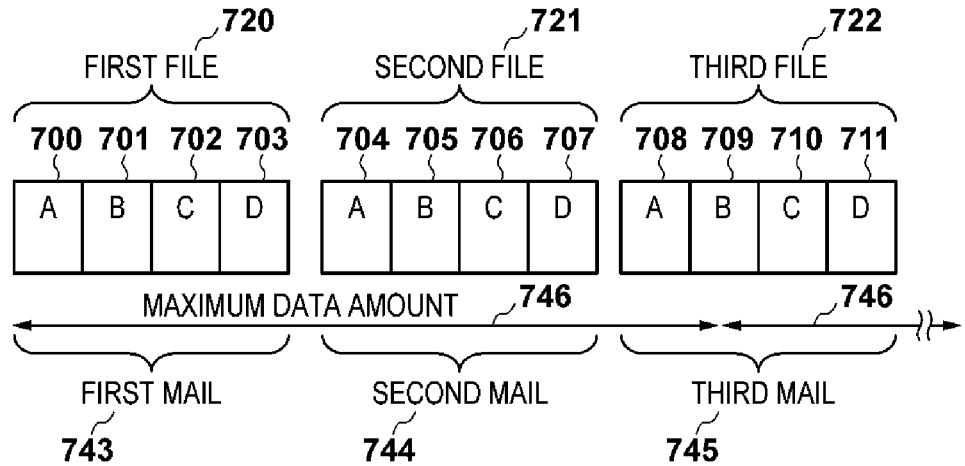

[Fig. 8]
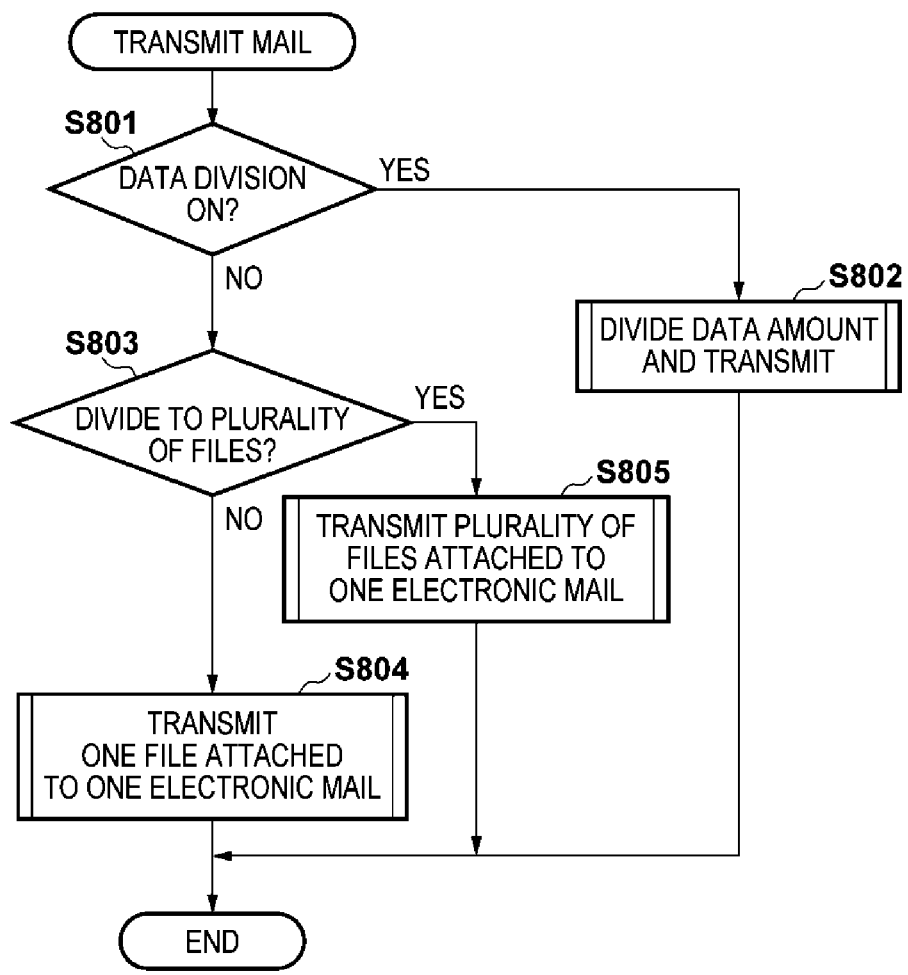

[Fig. 9]
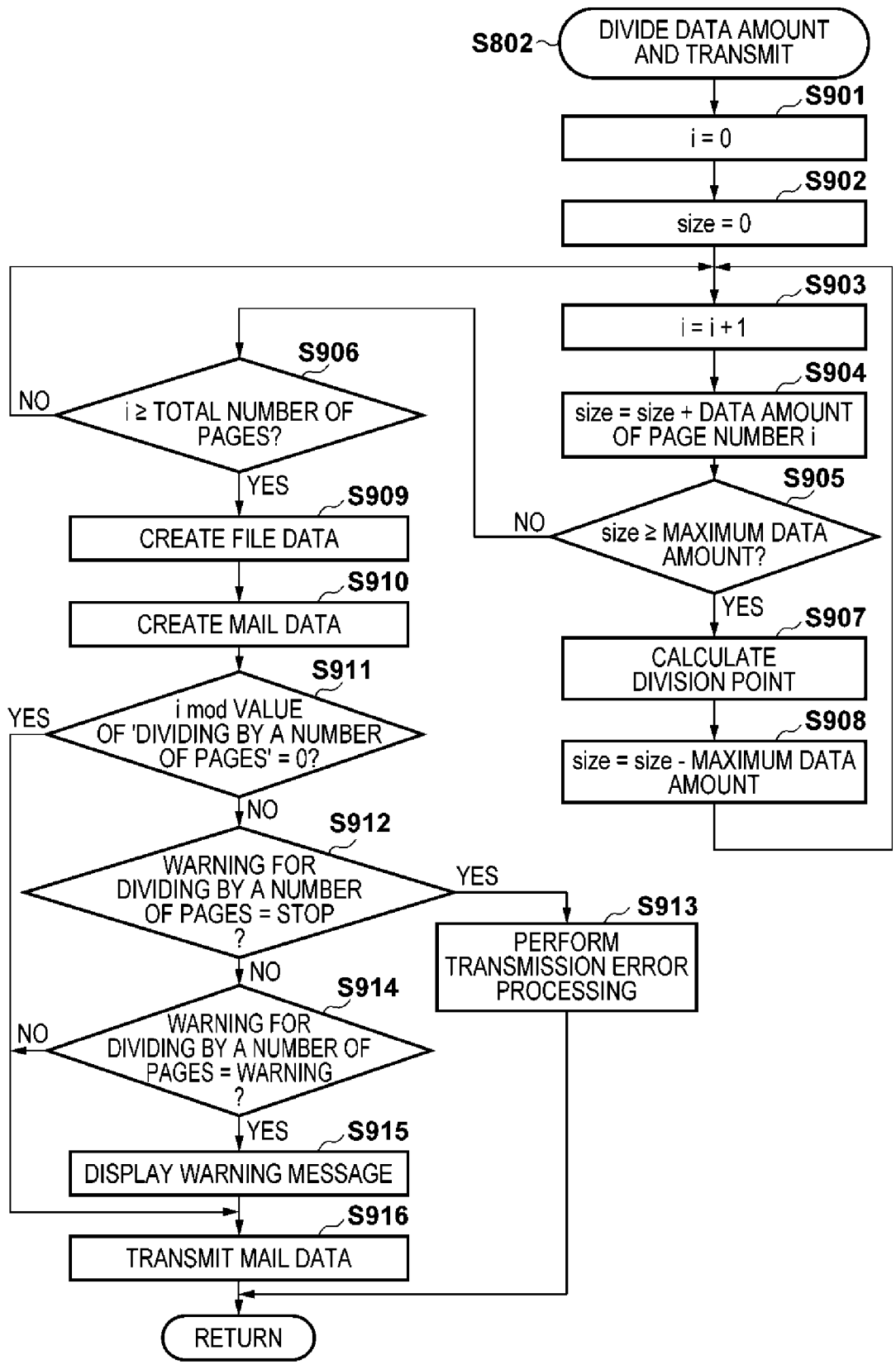

[Fig. 10]
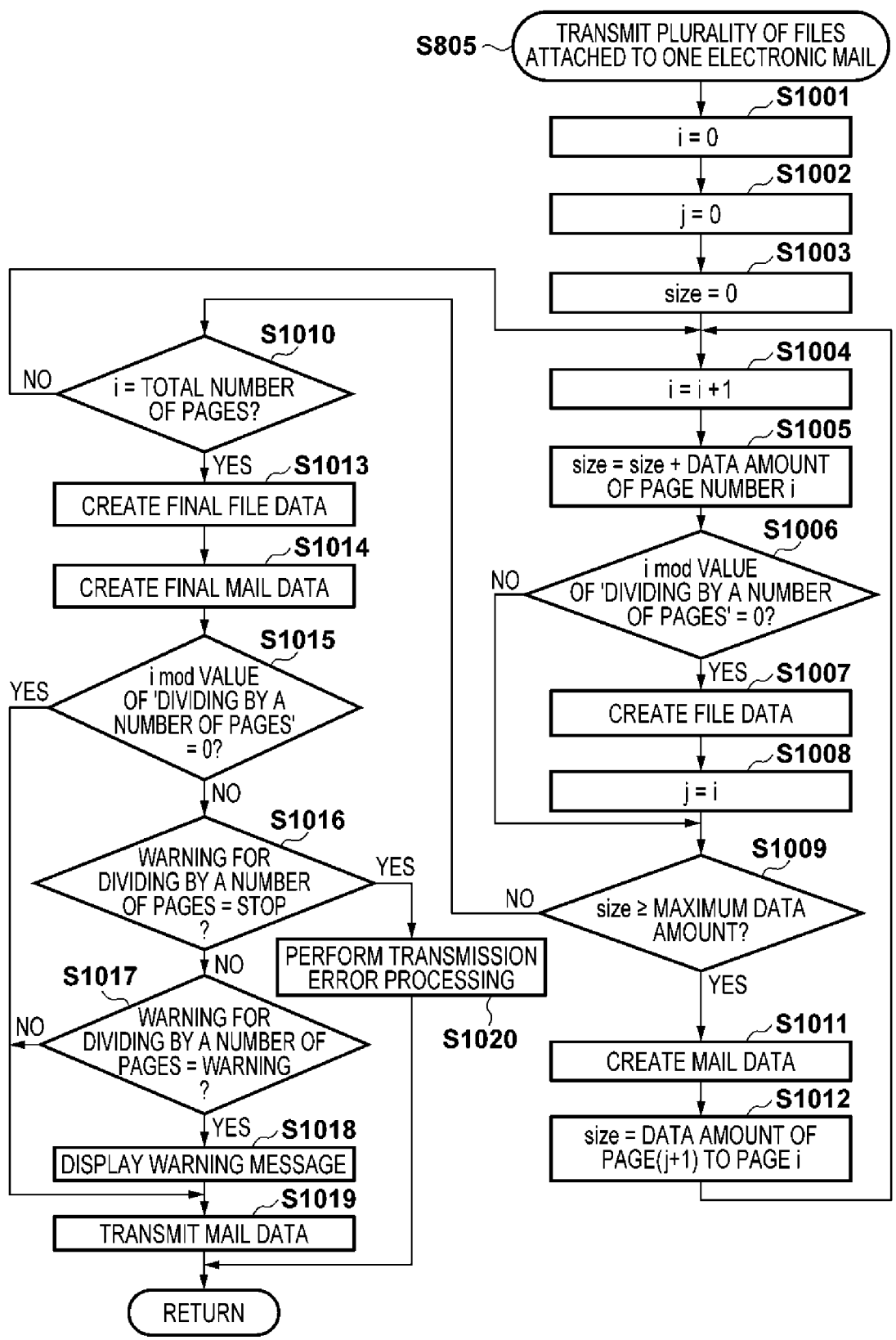

[Fig. 11]
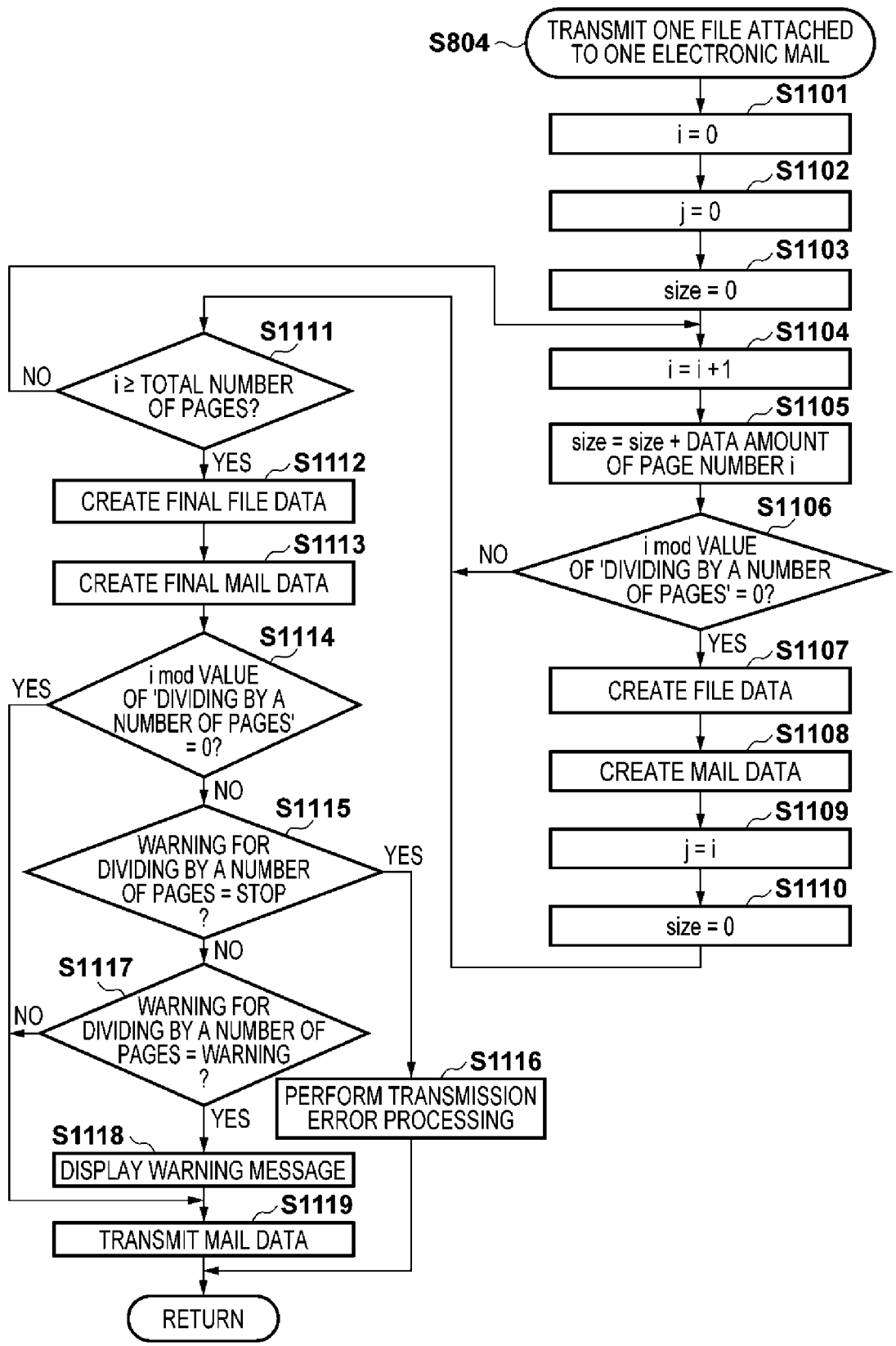

IMAGE PROCESSING APPARATUS, METHOD OF CONTROLLING THE SAME, AND STORAGE MEDIUM

TECHNICAL FIELD

The present invention relates to an image processing apparatus, a method of controlling the image processing apparatus, and a storage medium.

BACKGROUND ART

In a mail server, because performance worsens when processing a large volume of electronic mail, often the mail server is set so as to restrict the data amount of electronic mail, and to not send more than a predetermined data amount of electronic mail. Therefore, when transmitting a large volume of electronic mail, data of that electronic mail is divided using a message/partial format MIME (Multipurpose Internet Mail Extensions) identifier prescribed in RFC 2046. Thus, the electronic mail is transmitted such that the data amount of the electronic mail does not exceed a data amount that has been set in advance.

Also, in an image communication apparatus that reads and transmits an original, it is difficult to predict how much data will be transmitted prior to reading the original with a scanner. Therefore, there are instances in which, when attempting to transmit image data of an original that was read, the data amount is a prescribed amount or greater and so a transmission error occurs. In order to address such problems, for example in Patent Literature 1 (PTL 1), a technique is described in which image data that was obtained by reading with a scanner is divided into page units, and is transmitted such that the transmitted data amount does not exceed a prescribed value.

Also, in Patent Literature 2 (PTL 2), a technique is described in which, in a case where the data amount of electronic mail received by a mail server exceeds a restriction value, that electronic mail is transmitted after being divided.

CITATION LIST

Patent Literature

PTL 1: Japanese Patent Laid-Open No. 2013-047957
PTL 2: Japanese Patent Laid-Open No. 2012-094112

For example, there are originals where a predetermined number of pages constitute one set, such as a driver's license application form. It is necessary to read a plurality of sets of this sort of original (fixed-form document) and save them in a file. It is laborious to repeatedly cause reading and transmission of such a plurality of sets of fixed-form documents one set at a time. It is also laborious to collectively scan those documents to convert them to a file, and afterward transmit the file to a PC and divide the file in the PC. Therefore, a technique also exists in which the number of pages of a fixed-form document is input in advance, a plurality of the fixed-form documents are collectively read based on the number of pages that was input, a file is created for each fixed-form document that was read, and the files are transmitted in a single electronic mail. When a plurality of copies of a fixed-form document composed of a plurality of pages are transmitted attached to an electronic mail in this way, the data amount of the electronic mail becomes large and there is an increased risk that a transmission error will occur. Also, when the number of divided electronic mail becomes too large, the electronic mail becomes difficult to handle, so transmission of electronic mail with a small number of divisions is desirable.

SUMMARY OF INVENTION

Technical Problem

An aspect of the present invention is to eliminate the above-mentioned problems with conventional technology.

A feature of the present invention is to provide a technique where, when transmitting a plurality of sets of image data that are each composed of a predetermined number of pages, by creating an image data file and transmitting the file attached to an electronic mail, the image data is transmitted with a small number of divisions.

Solution to Problem

According to a first aspect of the present invention, there is provided an image processing apparatus, comprising: reading means for reading an original; receiving means for receiving a number of pages to be included in one file from a user; and creation means for dividing image data of an original read by the reading means at each set of the number of pages received by the receiving means, and creating a file including the image data for each division of the divided image data.

According to a second aspect of the present invention, there is provided a method for controlling an image processing apparatus, comprising: a reception step of receiving a number of pages to be included in one file from a user; a reading step of reading an original; and a creation step of creating, by dividing image data of the original read in the reading at each set of the number of pages received by the receiving means, a file including the image data for each division of the divided image data.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 depicts a view for explaining the configuration of a communication system including an image communication apparatus according to an embodiment of the present invention.

FIG. 2 is a block diagram for describing the configuration of an MFP according to the embodiment.

FIG. 3 shows a view illustrating an exemplary setting screen for setting the file format of an image file when converting image data obtained by a scanner of the MFP according to the embodiment to an image file, and transmitting the image file attached to an electronic mail.

FIG. 4 is a flowchart for describing processing executed according to a user operation, in a state where the MFP according to the embodiment is displaying the file format setting screen in FIG. 3.

FIG. 5 shows a view illustrating an exemplary screen for setting an address and whether or not to divide data when transmitting data to that address, displayed in a console unit of the MFP according to the embodiment.

FIG. 6 shows a view illustrating an exemplary screen for performing electronic mail transmission settings, displayed in a console unit of the MFP according to the embodiment.

FIG. 7A depicts a view for describing how electronic mail is divided when transmitting the electronic mail, in the MFP according to the embodiment.

FIG. 7B depicts a view for describing how electronic mail is divided when transmitting the electronic mail, in the MFP according to the embodiment.

FIG. 7C depicts a view for describing how electronic mail is divided when transmitting the electronic mail, in the MFP according to the embodiment.

FIG. 8 is a flowchart for describing electronic mail transmission processing by the MFP according to the embodiment.

FIG. 9 is a flowchart for describing processing to divide and transmit data in step S802 in FIG. 8.

FIG. 10 is a flowchart for describing processing to transmit a plurality of files attached to one electronic mail in step S805 in FIG. 8.

FIG. 11 is a flowchart for describing processing to transmit one file attached to one electronic mail in step S804 in FIG. 8.

DESCRIPTION OF EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

FIG. 1 depicts a view for explaining a configuration of a communication system including an image communication apparatus according to the embodiment of the present invention.

An MFP 100 is a Multi Function Peripheral in which an electrophotographic method is adopted, and that is provided with a copy function, a FAX function, a printer function, and the like, and is connected to a network 110. The MFP 100 is also provided with a SEND function to transmit a file of image data obtained by a scanner (a reading unit) to a computer device, and an IFAX (Internet FAX) function to communicate image data obtained by a scanner between devices of the same type, and print received image data. A domain name 'abc.co.jp' is assigned to the network 110, and a mail server 102 is also connected to the network 110. The mail server 102 is capable of communicating with the MFP 100 using SMTP and POP3 protocols to send an electronic mail to which an image file has been attached. The network 110 is connected to an internet 111, and thus is connected to a global network.

A mail server 104 and a client PC 105 are connected to a network 112, a domain name 'xyz.co.jp' is assigned to the network 112, and the network 112 is also connected to the internet 111. The mail server 104 is a mail server that processes the SMTP and POP3 protocols, and is capable of communicating also with the mail server 102 using the SMTP protocol through the internet 111. An MFP 106 is a Multi Function Peripheral provided with copy, FAX, and printer functions similar to the functions of the MFP 100.

Here, image viewer software is installed in the client PC 105, so image data obtained by scanning with an MFP can be received and displayed in the client PC 105, and image data can also be transmitted to an MFP and printed. Also, electronic mail client software is installed in the client PC 105, so it is possible to send/receive electronic mail in cooperation with the mail server 104. Note that in the present embodiment, a Multi Function Peripheral is described as an example of an image communication apparatus, but the image communication apparatus may also be an apparatus provided with only a SEND function. Also, the image communication apparatus may be an apparatus provided with only an IFAX function.

FIG. 2 is a block diagram for describing the configuration of the MFP 100 according to the embodiment. Note that the MFP 106 also has a similar configuration, so a description of the MFP 106 is omitted.

A CPU 130 executes a boot program stored in a ROM 131 to deploy an OS or program installed in a hard disk 137 to a RAM 132 and executes the OS or program, and thus controls operation of the entire MFP 100. A console unit 133 has a display panel and hard keys such as a start key, a numeric keypad, and the like, and displays software buttons on the display panel, and by detecting a user touching a button with a finger, smoothly executes a user operation. A scanner 134 reads an image of an original, and creates image data corresponding to the image of the original. A printer 135 prints an image based on the image data on a recording medium (sheet). An image processing circuit 136 includes a high capacity image memory, an image rotation circuit, a resolution conversion circuit, codec circuits for codecs such as MH, MR, MMR, JBIG, JPEG, and the like, and is also capable of executing various image processing such as shading, trimming, masking, and the like. A hard disk 137 is a high capacity recording medium connected with an interface such as a SCSI or IDE interface. A network interface 138 is a circuit for connecting to the network 110, such as an Ethernet (registered trademark) network, of which 10BASE-T and 100BASE-T are representative, or a token ring network or the like.

A formatter 139 creates image data for printing with the printer 135. When PDL (Page Description Language) data is received from a PC through the network interface 138, the formatter 139 creates image data from the received PDL data. Then, image processing is performed on the created image data by the image processing circuit 136, and the image data is printed with the printer 135. The scanner 134, the printer 135, the image processing circuit 136, and the formatter 139 are connected through a high-speed video bus separate from a CPU bus to which the CPU 130 is connected, and are configured such that image data can be transferred at high speed. The MFP 100 performs image processing on the image data obtained by the scanner 134 with the image processing circuit 136, then outputs that image data to the printer 135 and causes the image data to be printed, thereby realizing a copy function. A facsimile unit 140 performs facsimile communication between the MFP 100 and an external apparatus over a telephone line 142. Image processing is performed on the image data obtained by the scanner 134 with the image processing circuit 136, and then the image data is transmitted to the external apparatus over the telephone line 142. Alternatively, after facsimile data is received from the external apparatus and image processing is performed with the image processing circuit 136, the facsimile data is output to the printer 135 and printed. Also, an image file that is a JPEG file, a PDF file, a TIFF file, or the like is created by the image processing circuit 136 from the image data obtained by the scanner 134. With the SEND function, a PDF image file created in this way is transmitted through the network interface 138 using a communication protocol such as SMTP, FTP, SMB, or the like. This SEND function is categorized into file transmission, electronic mail transmission, internet facsimile (IFAX) transmission, and FAX transmission. A function to transmit an image file that is a JPEG file, a PDF file, a TIFF file, or the like using the SMTP protocol is referred to as electronic mail transmission, and a function to transmit an image file using FTP, SMB, or WebDAV is referred to as file transmission.

IFAX transmission is prescribed in RFC 2305, and realizes a facsimile function by attaching an image file to an electronic mail and sending/receiving the electronic mail between devices of the same type. In IFAX transmission, a TIFF file prescribed in RFC 3949 is created by the image processing circuit 136 from image data obtained by the scanner 134, and the TIFF file is transmitted using the SMTP protocol. Such an electronic mail is received as a TIFF file using an SMTP or POP3 function, changed to a formatted image by the image processing circuit 136, and then printed using the printer 135. In FAX transmission, a connection to the telephone line 142 is established using the facsimile unit 140, and G3FAX transmission is performed. A serial interface 143 is a serial interface such as an RS-232C interface, and is an interface for connecting an external serial device to the MFP 100. By connecting a card reader 144 to the serial interface 143, and a user causing the card reader 144 to read a card 120, it is possible to obtain information recorded on the card 120.

Following is a description of an example where image data obtained by scanning with the MFP 100 is attached to an electronic mail, and transmitted to an address of the client PC 105 through the mail servers 102 and 104.

FIG. 3 shows a view illustrating an exemplary setting screen for setting the file format of an image file when converting image data obtained by the scanner 134 of the MFP 100 according to the embodiment to an image file, and transmitting the image file attached to an electronic mail. This setting screen is displayed in the display panel of the console unit 133, and by touching this screen, a user can input a user designation.

When transmitting the image data obtained by the scanner 134 in JPEG file format, the user selects a JPEG button 200, and when transmitting the image data in TIFF file format, the user selects a TIFF button 201. Also, in a case where the image data obtained by the scanner 134 is transmitted as a JPEG file when the image data is color data, and is transmitted as a TIFF file when the image data is monochrome image data, the user selects a TIFF/JPEG (auto) button 202. Also, when transmitting the image data in PDF file format, the user selects a PDF button 203, and when transmitting the image data in XPS file format, the user selects an XPS button 204, and when transmitting the image data in OOXML file format, the user selects an OOXML button 205. Further, when transmitting the image data in PDF, XPS, or OOXML format, the user can set various settings through a sub-window 206.

Through the sub-window 206, it is possible to set further options in the PDF file format. Following is a description of items of the sub-window 206. An outline button 210 designates a function to create an outline PDF, in which by superimposing a text portion within image data obtained by scanning within PDF data converted to outline data, it is possible to preserve the quality of the text portion of the image. A high compression rate button 212 designates a function in which a text portion and an image portion of the image data are separated, and by applying an appropriate compression method to each portion, the amount of data can be reduced. A small number of colors button 211 designates a function to efficiently process an original such as in which a line was drawn in red pen on a text original that was printed in monochrome. With this function, by separating a text portion and an image portion of the image data, and the text portion approximating approximate colors that are at most 32 colors, with a high compression rate PDF, an even smaller data amount can be realized. An OCR button 214 designates a function in which optical character recognition is performed on image data of a text portion, and substitutes character data within the PDF data. An encryption button 215 designates a function to encrypt the PDF file by inputting a password. An electronic signature button 216 designates a function to insert an electronic signature including a machine number of a device within the PDF data, or a function to insert an electronic signature including information of a transmitter into the PDF data. Thus, it is possible to specify the machine or the transmitter that transmitted a file from the file that was transmitted.

A 'dividing by a number of pages' button 220 is a button that, for example such as in the case of a driver's license application form, with a set of a predetermined number of pages of a fixed-form original serving as one copy, designates the number of pages of one set (one copy) when reading a plurality of copies (for a plurality of applicants) at once, converting each single copy of the fixed-form original to a file, and saving the file. In FIG. 3, the button 220 is set to divide by four pages. When the button 220 is selected and input of a numerical value using the numeric keypad of the console unit 133 is received from the user, the received numerical value is set as the number of pages of one set (one copy) of the original. When performing scanning, image data of the plurality of pages (plurality of copies) of the original that was read and is to be transmitted is divided such that the number of pages designated here serves as one copy (one set). When designating to collectively attach the plurality of copies of the original to electronic mail and transmit the plurality of copies (transmit the plurality of sets), one file (one copy) is transmitted attached to one electronic mail, or alternatively, a plurality of files (a plurality of copies) are transmitted attached to one electronic mail. Selection of this transmission method will be described later.

In the case of a JPEG file, a plurality of pages of data cannot be inserted into one file. Therefore, when the JPEG button 200 has been selected, the 'dividing by a number of pages' button 220 is changed to a grayed-out display indicating that operation cannot be received, and is set to a default value of '1'. Thus, when a JPEG file has been selected, setting of a numerical value for 'dividing by a number of pages' is made impossible. When the TIFF/JPEG (auto) button 202 has been selected, in a case where the read original is a color original, a JPEG file is created, so likewise, the 'dividing by a number of pages' button 220 is displayed grayed-out, and is set to '1'. An OK button 221 confirms and registers the content that has been set in this screen, and returns to a higher-ranking screen.

FIG. 4 is a flowchart for describing processing executed according to a user operation, in a state where the MFP 100 according to the embodiment is displaying the file format setting screen in FIG. 3. Note that the processing shown in this flowchart is realized by the CPU 130 deploying a program stored in the hard disk 137 to the RAM 132 and executing the program.

This processing is started by the file format setting screen shown in FIG. 3 being displayed in the display panel of the console unit 133.

First, in step S401, the CPU 130 determines whether or not the display panel screen being displayed here was touched. When the screen is touched, the CPU 130 proceeds to step S402. In step S402, the CPU 130 checks whether or not the position that was touched is the position of the JPEG button 200, and if so, the processing proceeds to step S404 and the CPU 130 sets the file format to JPEG, and the processing proceeds to step S405. On the other hand, when the CPU 130 determines in step S402 that the JPEG button 200 has not been designated, the processing proceeds to step S403, and the CPU 130 determines whether or not the TIFF/JPEG (auto) button 202 was touched. If the TIFF/JPEG (auto) button 202 was touched, the processing proceeds to step S407, and the CPU 130 sets the file format to TIFF/JPEG (auto), and then the processing proceeds to step S405.

In step S405, the CPU 130 sets the value of the 'dividing by a number of pages' button 220 to '1', and the processing advances to step S406. In step S406, the CPU 130 sets the 'dividing by a number of pages' button 220 to a grayed-out display, sets the 'dividing by a number of pages' button 220 such that pressing of the 'dividing by a number of pages' button 220 is not received, and then the processing proceeds to step S418. Note that when another file format is set, in step S420, the CPU 130 operates to release the grayed-out display of the 'dividing by a number of pages' button 220, and then the processing proceeds to step S401.

When determined in step S403 that the TIFF/JPEG (auto) button 202 has not been touched, the processing proceeds to step S408 and the CPU 130 determines whether or not the TIFF button 201 was touched. If so, the processing proceeds to step S409 and the CPU 130 sets the file format to TIFF, and in step S420 the CPU 130 releases the grayed-out display of the 'dividing by a number of pages' button 220, and then the processing returns to step S401.

When determined in step S408 that the TIFF button 201 has not been touched, the processing proceeds to step S410 and the CPU 130 determines whether or not the PDF button 203 was touched. When the PDF button 203 was touched, the processing proceeds to step S411, and the CPU 130 sets the file format to PDF, displays the sub-window 206, in step S420 releases the grayed-out display of the 'dividing by a number of pages' button 220, and then the processing returns to step S401.

When determined in step S410 that the PDF button 203 has not been touched, the processing proceeds to step S412 and the CPU 130 determines whether or not the XPS button 204 was touched, and if so, the processing proceeds to step S413, and the CPU 130 sets the file format to XPS, and displays the sub-window 206. Then, in step S420, the CPU 130 releases the grayed-out display of the 'dividing by a number of pages' button 220, and the processing returns to step S401. Also, when determined in step S412 that the XPS button 204 has not been touched, the processing proceeds to step S414 and the CPU 130 determines whether or not the OOXML button 205 was touched. If so, the processing proceeds to step S415, and the CPU 130 sets the file format to OOXML, displays the sub-window 206, in step S420 releases the grayed-out display of the 'dividing by a number of pages' button 220, and then the processing returns to step S401. When determined in step S414 that the OOXML button 205 has not been touched, the processing proceeds to step S416 and the CPU 130 determines whether or not the 'dividing by a number of pages' button 220 was touched.

When determined in step S416 that the 'dividing by a number of pages' button 220 was touched, the processing proceeds to step S417, and the CPU 130 enables a keyboard for numerical value input, substitutes the input value for the pages division number ('4' in the example in FIG. 3), and then the processing proceeds to step S401. When determined in step S416 that the 'dividing by a number of pages' button 220 has not been touched, the processing proceeds to step S418, and the CPU 130 determines whether or not the OK button 221 was touched. When determined that the OK button 221 has not been touched, the processing proceeds to step S401, and when determined that the OK button 221 was touched, the processing proceeds to step S419, and the CPU 130 registers the values that were set in this setting screen as setting values, and then ends this processing.

FIG. 5 shows a view illustrating an exemplary screen for setting an address and whether or not to divide data when transmitting data to the address, displayed in the console unit 133 of the MFP 100 according to the embodiment.

An electronic mail address button 500 is a button configured to input an electronic mail address of an address, prescribed in RFC 2822, and when this button is pressed an alphabetic keyboard is enabled, so that an electronic mail address can be input using the keyboard. A 'data division' ON switch 501 and OFF switch 502 are toggle switches, and when one of these switches is set the other switch is released. Here, when the ON switch 501 is touched so that 'data division' is set to ON, when sending to this address, electronic mail data is transmitted divided in a message/partial format prescribed in RFC 2046. Also, if the mail software used by the recipient who received this electronic mail is compatible with this scheme, when the mail software finishes receiving all electronic mail, the mail software combines all of the electronic mail to restore the original electronic mail. Note that not all mail software is compatible with this scheme, so a configuration is adopted in which 'data division' can be set to ON only for an address capable of handling electronic mail in this scheme. An OK button 503 is a button for confirming the settings of this screen and designating to register these settings in an address book.

FIG. 6 shows a view illustrating an exemplary screen for performing electronic mail transmission settings, displayed in the console unit 133 of the MFP 100 according to the embodiment.

A 'maximum data amount' 600 indicates a maximum data amount when transmitting electronic mail, and electronic mail that exceeds this data amount is divided and then transmitted, or a transmission error occurs and this electronic mail is not transmitted. Note that this data amount is not the data amount of an attached file, but is the data amount of electronic mail data including the attached file. When a 'plurality of files' 601 of a 'mail division' 620 is selected, it is possible to transmit a plurality of files attached to one electronic mail. Therefore, even when there are many pages of an original, it is possible to suppress an increase in the number of electronic mails. When a 'one file in one mail' 602 is selected, one file can be attached to one electronic mail. Therefore, this setting is effective when wishing to associate an attached file with an electronic mail. The 'plurality of files' 601 of the 'mail division' 620 is exclusively related to the 'one file in one mail' 602, and when the 'plurality of files' 601 is selected the 'one file in one mail' 602 is non-selected. This is similarly true in the opposite case as well.

When a number of pages has been input with the 'dividing by a number of pages' button 220 in FIG. 3, the original is divided at the number of pages designated there, and one file is formed for each respective division. At this time, if part of the original is lost or the like, then the final file will not have the designated number of pages. In such a case, an operation designated with a 'warning for dividing by a number of pages' 621 is implemented. When a 'non-warning' 603 has been selected, the electronic mail is transmitted without giving a warning. When a 'warning' 604 has been selected, operation is performed to display a warning message on the console unit 133, and the user is caused to confirm whether or not the original is correctly set, or alternatively whether or not the numerical value that has been set with the 'dividing by a number of pages' button 220 is correct. When a 'stop' 605 has been selected, the transmission operation is stopped, and a transmission error code is recorded in a job history. When an OK button 610 is touched, the setting values that have been input in this screen are confirmed and registered, and this setting screen is closed.

FIGS. 7A to 7C depict views for describing how electronic mail is divided when transmitting the electronic mail, in the MFP 100 according to the embodiment. Note that here, in order to simplify the description, originals are considered to be one-sided originals, and the number of pages of originals is considered to be the same as the number of pages of originals that were read.

Originals 700 to 711 indicate a total of 12 pages, with three copies of a fixed-form document where four pages A to D form one set, and these originals are read with the scanner 134. Here, a value of '4' has been set in the 'dividing by a number of pages' button 220 in FIG. 3. The data amount expressed here is not the data amount of the image data, but is the data amount of an entire mail to be transmitted as electronic mail data.

The electronic mail data is created by performing BASE64 conversion of image data, and therefore has about 1.33 times the data amount of the source image data. Here, a value of '4' has been set in the 'dividing by a number of pages' button 220, so the pages of originals are divided by four, and thus the originals 700 to 703 are converted to a first file 720, the originals 704 to 707 are converted to a second file 721, and the originals 708 to 711 are converted to a third file 722.

FIG. 7A depicts a view illustrating a data amount divided transmission when performing transmission to an address for which 'data division' is set to ON in FIG. 5.

When a maximum data amount 726 in FIG. 7A has been set for the 'maximum data amount' 600 in FIG. 6, data is transmitted divided into a first mail 723 and a second mail 724 having a data amount equivalent to the maximum data amount 726, and the remaining data in a third mail 725.

FIG. 7B depicts a view illustrating a divided transmission in a plurality of files when the 'plurality of files' 601 has been selected in the 'mail division' 620 in FIG. 6.

When a data amount corresponding to a maximum data amount 735 in FIG. 7B has been set for the 'maximum data amount' 600 in FIG. 6, the first file 720 and the second file 721 are attached to a first electronic mail 733. The third file 722 of a data amount exceeding the data amount indicated by the maximum data amount 735 is transmitted attached to a second electronic mail 734.

FIG. 7C depicts a view illustrating 'one file in one mail' transmission when the 'one file in one mail' 602 has been selected in the 'mail division' 620 in FIG. 6.

A data amount corresponding to a maximum data amount 746 in FIG. 7C is presumed to be set for the 'maximum data amount' 600 in FIG. 6. In this case, the data amount of each file is less than the maximum data amount 746, so the first file 720 is transmitted attached to a first electronic mail 743, the second file 721 is transmitted attached to a second electronic mail 744, and the third file 722 is transmitted attached to a third electronic mail 745.

FIG. 8 is a flowchart for describing electronic mail transmission processing by the MFP 100 according to the embodiment. Note that the processing shown in this flowchart is realized by the CPU 130 deploying a program stored in the hard disk 137 to the RAM 132 and executing the program.

This processing is started by the scanner 134 ending original reading. First, in step S801, the CPU 130 determines whether or not the transmission destination is the address for which 'data division' is set with the ON switch 501 in FIG. 5. When determined that the transmission destination is the address for which 'data division' is set to ON, the processing proceeds to step S802, and the CPU 130 divides and transmits data, and ends this processing. On the other hand, when determined in step S801 that 'data division' is set to OFF, the processing proceeds to step S803, and the CPU 130 determines whether or not the 'plurality of files' 601 is selected in the 'mail division' 620 of FIG. 6. When determined that the 'plurality of files' 601 is selected, the processing proceeds to step S805, and the CPU 130 transmits a plurality of files attached to one electronic mail, and then ends this processing. On the other hand, when determined in step S803 that the 'plurality of files' 601 is not selected, the 'one file in one mail' 602 is selected, so the processing proceeds to step S804, and the CPU 130 transmits one file attached to one electronic mail, and then ends this processing.

FIG. 9 is a flowchart for describing processing to divide the data amount and transmit data in step S802 in FIG. 8.

First, in step S901, the CPU 130 sets a variable 'i' that counts a number of pages of originals to '0' as an initial value, and then in step S902 the CPU 130 sets a variable 'size' that stores a cumulative data amount to '0'. Note that these variables are provided in the RAM 132. Next, the processing proceeds to step S903 and the CPU 130 adds 1 to the variable 'i'. Then, the processing proceeds to step S904 and the CPU 130 adds a data amount of page number 'i' to the variable 'size'. Initially, the data amount of the first page is stored in the variable 'size'. Then, the processing proceeds to step S905 and the CPU 130 determines whether or not the variable 'size' is at least the maximum value of the data amount.

For example in the case of FIG. 7A, the data amount of the first page is less than the maximum data amount 726, so the processing advances to step S906. In step S906, the CPU 130 determines whether or not the variable 'i' has reached the total number of pages of originals to be transmitted. Initially, for example in FIG. 7A, the variable 'i' has not reached a total of 12 pages, so the processing returns to step S903. When the above-described processing is repeated, for example in FIG. 7A, when the variable 'i' reaches '6', the value of the variable 'size' exceeds the maximum data amount 726, so the processing proceeds from step S905 to step S907. In step S907, the CPU 130 calculates a division point of the first mail 723. Here, for the division point, the CPU 130 calculates what byte number of the sixth page of data at which to divide, because the maximum data amount 726 is reached. Next, the CPU processing proceeds to step S908, and the CPU 130 subtracts the 'maximum data amount' 600 from the variable 'size'. That is, in the example in FIG. 7A, the maximum data amount 726 that was set for the 'maximum data amount' 600 in FIG. 6 is subtracted from the total data amount of six pages of originals. Thus, part of the data of the sixth page of originals is set for the variable 'size', and the processing returns to step S903. When the processing is repeated and, in the example in FIG. 7A, the variable 'i' that indicates the number of pages becomes '11', again in step S905, the value of the variable 'size' exceeds the maximum data amount 726, so the processing proceeds from step S905 to step S907. Then, in step S907, the CPU 130 calculates a division point of the second mail 724. This is performed in the same manner as the division point of the first mail 723 described above.

When the CPU 130 thus determines in step S906 that the variable 'i' has reached the total number of pages (here, '12'), the processing advances to step S909. In step S909, the CPU 130 creates file data. Here, for example, a value of '4' has been set in the 'dividing by a number of pages' button 220 in FIG. 3, so every four pages, for example as shown in FIG. 7A, the first file 720, the second file 721, and the third file 722 are created. Next, the processing proceeds to step S910, and the CPU 130 creates the first mail 723, the second mail 724, and the third mail 725 from the division points calculated in step S907.

Next, the processing proceeds to step S911, and the CPU 130 determines whether or not a remainder is '0' when dividing the variable 'i' (total number of pages) by the numerical value of the 'dividing by a number of pages' button 220. That is, the CPU 130 determines whether or not it is possible to transmit all of the total number of pages of originals to be transmitted, when divided by the numerical value of the 'dividing by a number of pages' button 220. For example, if the total number of pages of originals is an integer multiple of '4', it is possible to transmit all of the originals by transmitting with the numerical value of the 'dividing by a number of pages' button 220. Note that the numerical value of the 'dividing by a number of pages' button 220 in FIG. 3, in consideration of the total number of pages of originals to be transmitted by the user, is presumed to be set to a numerical value by which that total number of pages can be divided.

In the example in FIG. 7A, the total number of pages of originals is '12', so in step S911, the remainder is '0', and therefore the processing proceeds to step S916, and the CPU 130 transmits the mail created in step S910 (in the example in FIG. 7A, the first mail 723 to the third mail 725), and then ends this processing.

For example, in a case where the total number of pages of originals is '12', if scanning was performed with one copy of originals forgotten, or alternatively if a mistaken numerical value is set for the 'dividing by a number of pages' button 220 in FIG. 3, the remainder when dividing in step S911 is not '0', so the processing proceeds to step S912. In step S912, the CPU 130 determines whether or not the 'warning for dividing by a number of pages' 621 in FIG. 6 is set to the 'stop' 605. If so, the processing proceeds to step S913, and the CPU 130 implements transmission error processing, and then ends this processing. When determined in step S912 that the 'stop' 605 is not set, the processing proceeds to step S914, and the CPU 130 determines whether or not the 'warning' 604 is set. If so, the processing proceeds to step S915, and the CPU 130 displays a warning message, and then the processing proceeds to step S916. When determined in step S914 that the 'warning' 604 is not set, the processing proceeds to step S916 and the CPU 130 transmits the mail created in step S910, and then ends this processing. Note that a configuration may also be adopted in which, in a case where a warning message was displayed in step S915, the user may select to stop transmission of electronic mail.

FIG. 10 is a flowchart for describing processing to transmit a plurality of files attached to one electronic mail in step S805 in FIG. 8.

First, in step S1001, the CPU 130 sets the variable 'i' that counts a number of pages of originals to '0'. Then the processing proceeds to step S1002 and the CPU 130 sets a variable 'j' that counts a number of pages of originals included in a file attached to an electronic mail to '0'. Next, in step S1003, the CPU 130 sets each variable 'size' that stores a cumulative data amount to '0'. Next, the processing proceeds to step S1004 and the CPU 130 adds 1 to the variable 'i'. Initially, the variable 'i' is set to '1', indicating the first page. Next, the processing proceeds to step S1005 and the CPU 130 adds a data amount of page number 'i' to the variable 'size'. Initially, the data amount of the first page of originals is stored in the variable 'size'. Then, the processing proceeds to step S1006 and the CPU 130 determines whether or not the remainder is '0' when dividing the variable 'i' by the value set for the 'dividing by a number of pages' button 220. As described above, here, '4' is set in the 'dividing by a number of pages' button 220 in the example described above, so the remainder is not '0'. Therefore, the processing advances to step S1009. In step S1009, the CPU 130 determines whether or not the variable 'size' is at least the maximum data amount.

In the case of FIG. 7B, the maximum data amount 735 is larger than the data amount of the first page, so the processing advances to step S1010. In step S1010, the CPU 130 determines whether or not the variable 'i' has reached the total number of pages of originals. Here, a total of 12 pages of originals have been scanned, so the processing returns to step S1004. When the processing is repeated and the variable 'i' becomes '4', the result of dividing to calculate the remainder in step S1006 is '0' so the processing proceeds to step S1007. In step S1007, the CPU 130 creates file data. In the example in FIG. 7B, the CPU 130 creates the first file 720. Then the processing proceeds to step S1008, and the CPU 130 substitutes the value of the variable 'i' for the variable 'j'. Here, '4' is set for the variable 'j'. When the above-described processing is repeated and next the variable 'i' becomes '8', the processing proceeds from step S1006 to step S1007 and the CPU 130 creates the second file 721 in FIG. 7B. Then the processing proceeds to step S1008, and the CPU 130 substitutes the value of the variable 'i' for the variable 'j'. Here, '8' is set for the variable 'j'.

In the example in FIG. 7B, when the value of the variable 'i' becomes '10', the data amount of the variable 'size' exceeds the 'maximum data amount' 600, so the processing proceeds from step S1009 to step S1011. In step S1011, the CPU 130 creates the first mail 733 including the first file 720 and the second file 721 created in step S1007. Thus, a plurality of files composed of the first file 720 and the second file 721 are attached to the first mail 733. Next, the processing proceeds to step S1012 and the CPU 130 sets the data amount of originals from a variable (j+1) to the variable 'i' to the variable 'size', and then the processing proceeds to step S1004. That is, in the example in FIG. 7B, a cumulative data amount of the data amount of the ninth (j+1) page of originals and the data amount of the tenth (i) page of originals is set to the variable 'size', and then the processing proceeds to step S1004. Accordingly, a remaining data amount, obtained by subtracting the data amount of the two files 720 and 721 determined to be attached to the first mail 733 from the data amount that has already been verified, is stored in the variable 'size'. When the variable 'i' thus reaches the total number of pages (here, '12'), the processing proceeds from step S1010 to step S1013, and if there exists a file that has not yet been created, the CPU 130 creates a final file.

In the example in FIG. 7B, the third file 722 is created in step S1007 when the variable 'i' has become '12', so file creation is not performed. If there exists original data for which a file has not been created, here a file is created. Next the processing proceeds to step S1014, and the CPU 130 creates mail data if there is an electronic mail that has not been created in step S1011. In the example in FIG. 7B, mail data of the third file 722 has not been created, so the CPU 130 creates the second mail 734 with the third file 722 attached, and then the processing proceeds to step S1015. The processing in steps S1015 to S1020 is the same as the processing in steps S911 to S916 in above-described FIG. 9, so a simplified description of those steps is given here.

Next, in step S1015 the CPU 130 determines whether or not the remainder is '0' when dividing the variable 'i' by the numerical value (here, '4') of the 'dividing by a number of pages' button 220. In the case of FIG. 7B, the remainder is '0' so the processing proceeds to step S1019, and the CPU 130 transmits the created electronic mail, and then ends processing. If scanning was performed with one copy of originals forgotten, or if a mistaken numerical value was set for the 'dividing by a number of pages' button 220, the remainder is not '0', so the processing proceeds to step S1016. In step S1016, the CPU 130 determines whether or not the 'warning for dividing by a number of pages' 621 is set to the 'stop' 605, and if so, the processing proceeds to step S1020, and the CPU 130 implements transmission error processing, and then ends processing. In step S1017, the CPU 130 determines whether or not the 'warning for dividing by a number of pages' 621 is set to 'warning', and if so, the processing proceeds to step S1018 and the CPU 130 displays a warning message, and then in step S1019, transmits the created mail data and ends processing. Note that a configuration may also be adopted in which, in a case where a warning message was displayed in step S1018, the user can select to stop transmission of electronic mail. Note that in the flowchart in FIG. 10 as well, the variables 'i', 'j', and 'size' are provided in the RAM 132.

FIG. 11 is a flowchart for describing processing to transmit one file attached to one electronic mail in step S804 in FIG. 8.

First, in step S1101, the CPU 130 sets the variable 'i' that counts the number of pages of originals to '0'. Then the processing proceeds to step S1102 and the CPU 130 sets the variable 'j' that counts a number of pages of originals included in a file attached to an electronic mail to '0'. Next, in step S1103 the CPU 130 sets each variable 'size' that stores a cumulative data amount to '0'. Next, the processing proceeds to step S1104 and the CPU 130 adds 1 to the variable 'i'. Initially, the variable 'i' is set to '1'. Next, the processing proceeds to step S1105 and the CPU 130 adds a data amount of page number 'i' indicated by the variable 'i' to the variable 'size'. Initially, the data amount of the first page of originals is set for the variable 'size'. Then, the processing proceeds to step S1106 and the CPU 130 determines whether or not the remainder is '0' when dividing the variable 'i' by the value (here, '4') set for the 'dividing by a number of pages' button 220. Initially, the 'dividing by a number of pages' button 220 is set to '4' so the remainder is not '0', and so the processing proceeds to step S1111. In step S1111 the CPU 130 determines whether or not the variable 'i' has reached the total number of pages of originals, and if scanning of a total of 12 pages of originals has not completed, the processing returns to step S1104. When this loop is repeatedly executed and the variable 'i' becomes '4', the remainder is '0' in step S1106 so the processing proceeds to step S1107. In step S1107 the CPU 130 creates file data. Next, the processing proceeds to step S1108 and the CPU 130 creates a first electronic mail to which that first file will be attached. In the example of FIG. 7C, the CPU 130 creates the first file 720, and creates the first mail 743 to which the first file 720 will be attached.

Next, the processing proceeds to step S1109, and the CPU 130 substitutes the value of the variable 'i' (here, '4') for the variable 'j', then the processing proceeds to step S1110 and the CPU 130 sets the variable 'size' to '0', and then the processing proceeds to step S1111. When the above-described processing is repeated and in step S1106 the variable 'i' becomes '8', the processing proceeds to step S1107 and the CPU 130 creates a second file. Then the processing proceeds to step S1108, and the CPU 130 creates a second electronic mail to which that second file will be attached. In the example of FIG. 7C, the CPU 130 creates the second file 721, and creates the second mail 744 to which the second file 721 will be attached. When the same processing is further repeated and the variable 'i' becomes '12' in step S1106, the processing proceeds to step S1107 and the CPU 130 creates the third file 722, and in step S1108 creates the third mail 745.

Next, when the variable 'i' becomes '12' in step S1106, in step S1111 the variable 'i' equals the total number of pages, so the processing proceeds from step S1111 to step S1112. In step S1112, if there exists a file that has not yet been created, the CPU 130 creates a final file.

In the example in FIG. 7C, the third file 722, which is the final file, is created in step S1107, so a file is not created in step S1112. Next, in step S1113, in order to attach the final file, the CPU 130 creates mail data if there is an electronic mail that has not been created.

The processing in following steps S1114 to S1119 is the same as the processing in steps S911 to S916 in above-described FIG. 9, so a description of those steps is omitted here.

Note that in the flowchart in FIG. 11, it is presumed that the data amount of one file does not exceed the value of the 'maximum data amount' 600 that was set in FIG. 6. Accordingly, if the data amount of any of the first file 720 to the third file 722 in FIG. 7C exceeds the value of the 'maximum data amount' 600, processing for a transmission error is performed. Also note that in the flowchart in FIG. 11 as well, the variables 'i', 'j', and 'size' are provided in the RAM 132.

Other Embodiments

Note that in the above embodiment, an example is described in which when the JPEG button 200 has been selected, the 'dividing by a number of pages' button 220 is changed to a grayed-out display, and division setting becomes impossible. However, this is not a limitation, and a configuration may also be adopted in which the CPU 130 performs the grayed-out display such that receiving selection of the JPEG button 200 and setting of a numerical value by the 'dividing by a number of pages' button 220 is allowed, and in a state with the selection and setting received, the OK button 221 cannot be selected. Also, a configuration may be adopted in which after selection of the JPEG button 200 and setting of a numerical value by the 'dividing by a number of pages' button 220 are received, the OK button 221 is pressed, and settings are confirmed, the CPU 130 prohibits transmission based on a transmission designation by a user.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-182232, filed Sep. 15, 2015, which is hereby incorporated by reference herein in its entirety.

The invention claimed is:

1. An image processing apparatus, comprising:
a reader that reads one or more originals to generate image data corresponding to the one or more originals;
a memory device storing instructions; and
at least one processor that executes the instructions causing the image processing apparatus to:
provide a first setting screen for setting a maximum value of a data amount of each electronic mail;
receive, from a user via a registration screen for registering address information of an electronic mail to an address book, inputs of address information and a data division setting indicating whether to permit to transmit divided electronic mails based on data size on a mail transmission using the address information;
receive, from the user via a second setting screen for setting a file format, inputs of a file format and a numerical value of greater than or equal to; and
generate, according to the input of the numerical value, files using image data generated by reading a plurality of originals by the reader;
in a case where the address information to which the data division setting is enabled is used for transmitting the electronic mail that the generated files are attached to and a data amount of the electronic mail including the generated files exceeds the maximum value, transmit divided electronic mails that are created by dividing the electronic mail including the generated files based on data size according to the maximum value, wherein the divided electronic mails require combining by mail software of a recipient to restore the electronic mail including the generated files; and
in a case where the address information to which the data division setting is not enabled is used for transmitting the electronic mail that the generated files are attached to and a data amount of the electronic mail including the generated files exceeds the maximum value, transmit a plurality of electronic mails each including one or more files among the generated files, wherein the transmitted electronic mails do not require combining by the mail software of the recipient,
wherein, in transmitting the plurality of electronic mails in a case where the address information to which the data division setting is not enabled is used for transmitting the electronic mail that the generated files are attached to and the data amount of the electronic mail including the generated files exceeds the maximum value, for each of the plurality of electronic mails, one or more files to be included in an electronic mail are determined so that a data amount of the electronic mail does not exceed the maximum value, and
wherein a data amount of an electronic mail including the determined one or more files and a succeeding file exceeds the maximum value.

2. The image processing apparatus according to claim 1, wherein the instructions further cause the image processing apparatus to, in a case where the file format is a predetermined format that cannot include a plurality of pages in one file, control such that the numerical value is not input.

3. The image processing apparatus according to claim 2, wherein the predetermined format is TIFF/JPEG.

4. A method for controlling an image processing apparatus having a reader that reads one or more originals to generate image data corresponding to the one or more originals, the method comprising:
providing a first setting screen for setting maximum value of a data amount of each electronic mail;
receiving, from a user via a registration screen for registering address information of an electronic mail to an address book, inputs of address information and a data division setting indicating whether to permit to transmit divided electronic mails based on data size on a mail transmission using the address information;
receiving, from the user via a second setting screen for setting a file format, inputs of a file format and a numerical value of greater than or equal to one
generating, according to the input of the numerical value, files using image data generated by reading a plurality of originals by the reader,
in a case where the address information to which the data division setting is enabled is used for transmitting the electronic mail that the generated files are attached to and a data amount of the electronic mail including the generated files exceeds the maximum value, transmit divided electronic mails that are created by dividing the electronic mail including the generated files based on data size according to the maximum value, wherein the divided electronic mails require combining by mail software of a recipient to restore the electronic mail including the generated files; and
in a case where the address information to which the data division setting is not enabled is used for transmitting the electronic mail that the generated files are attached to and a data amount of the electronic mail including the generated files exceeds the maximum value, transmit a plurality of electronic mails each including one or more files among the generated files, wherein the transmitted electronic mails do not require combining by the mail software of the recipient,
wherein, in transmitting the plurality of electronic mails in a case where the address information to which the data division setting is not enabled is used for transmitting the electronic mail that the generated files are attached to and the data amount of the electronic mail including the generated files exceeds the maximum value, for each of the plurality of electronic mails, one or more files to be included in an electronic mail are determined so that a data amount of the electronic mail does not exceed the maximum value, and wherein a data amount of an electronic mail including the determined one or more files and a succeeding file exceeds the maximum value.

\* \* \* \* \*